United States Patent [19]
Deacon et al.

[11] Patent Number: 5,968,454
[45] Date of Patent: Oct. 19, 1999

[54] CHLORINE DIOXIDE GENERATOR

[75] Inventors: Peter W. Deacon, Fair Oaks; Jess McLaughlin, Rio Linda, both of Calif.

[73] Assignee: Vulcan Chemical Technologies, Inc., West Sacramento, Calif.

[21] Appl. No.: 09/053,815

[22] Filed: Apr. 2, 1998

[51] Int. Cl.$^6$ ................................ C01B 11/02; B01J 8/02
[52] U.S. Cl. ..................... 422/120; 422/122; 422/211; 422/218; 422/305; 423/477
[58] Field of Search ..................... 423/477–480; 422/120, 122, 305, 37, 181, 218, 211

[56] References Cited

U.S. PATENT DOCUMENTS

| | | | |
|---|---|---|---|
| 4,247,531 | 1/1981 | Hicks | 423/477 |
| 4,451,444 | 5/1984 | Santillie et al. | 423/480 |
| 4,590,057 | 5/1986 | Hicks | 423/477 |
| 4,618,479 | 10/1986 | Santillie et al. | 422/202 |
| 5,204,081 | 4/1993 | Mason et al. | 423/478 |

*Primary Examiner*—Hien Tran
*Attorney, Agent, or Firm*—Leonard Bloom

[57] ABSTRACT

An apparatus and method for generating chlorine dioxide. Reagents are introduced into the lower end of a reaction column through "V" inlets. The reagent column surrounds a center column through which motive fluid moves upwardly into a nozzle and venturi throat to produce a zone of reduced pressure at the upper end of the reaction column. The reagents move upwardly through the column interacting throughout 360°. Reaction product exits the generator through the venturi throat.

9 Claims, 5 Drawing Sheets

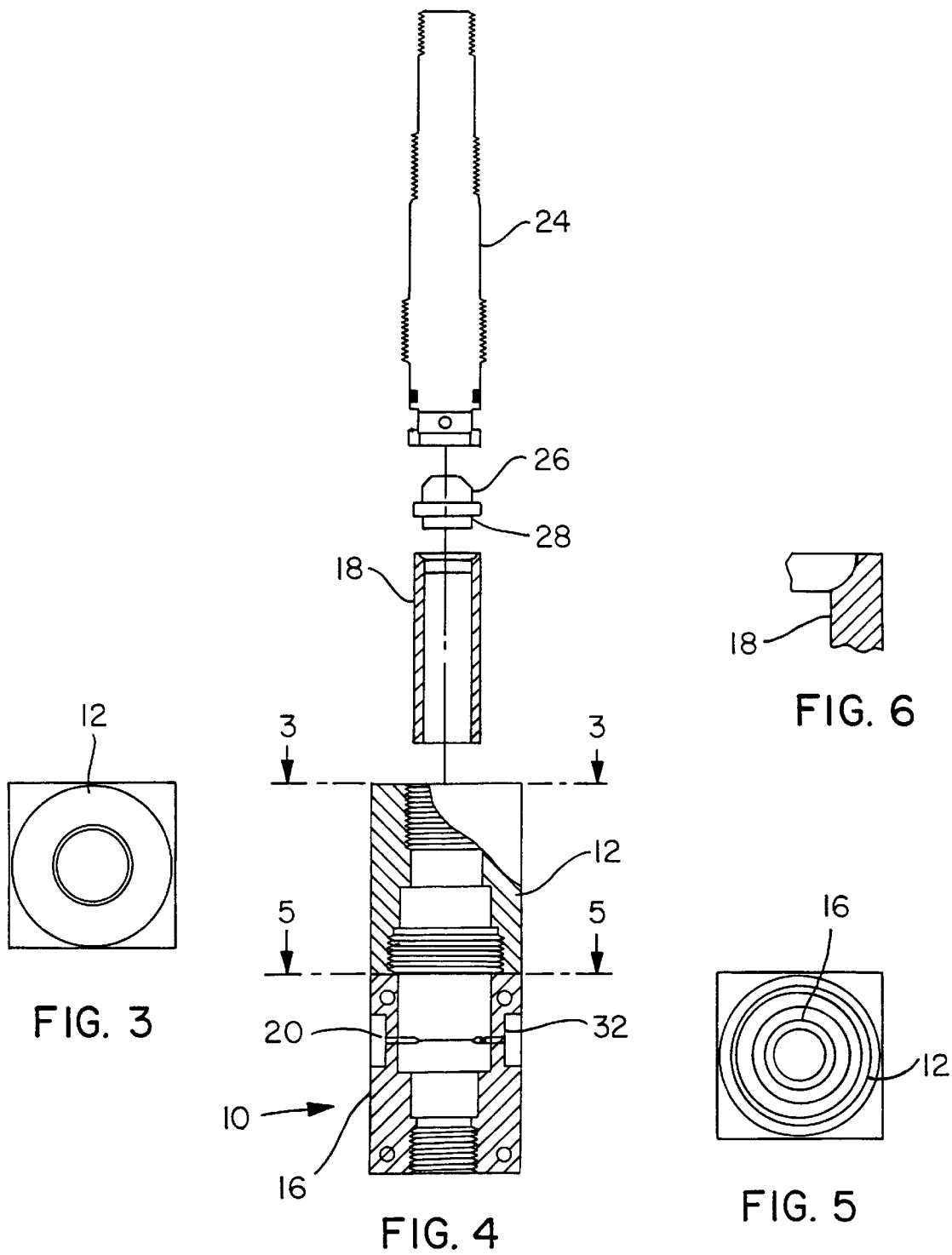

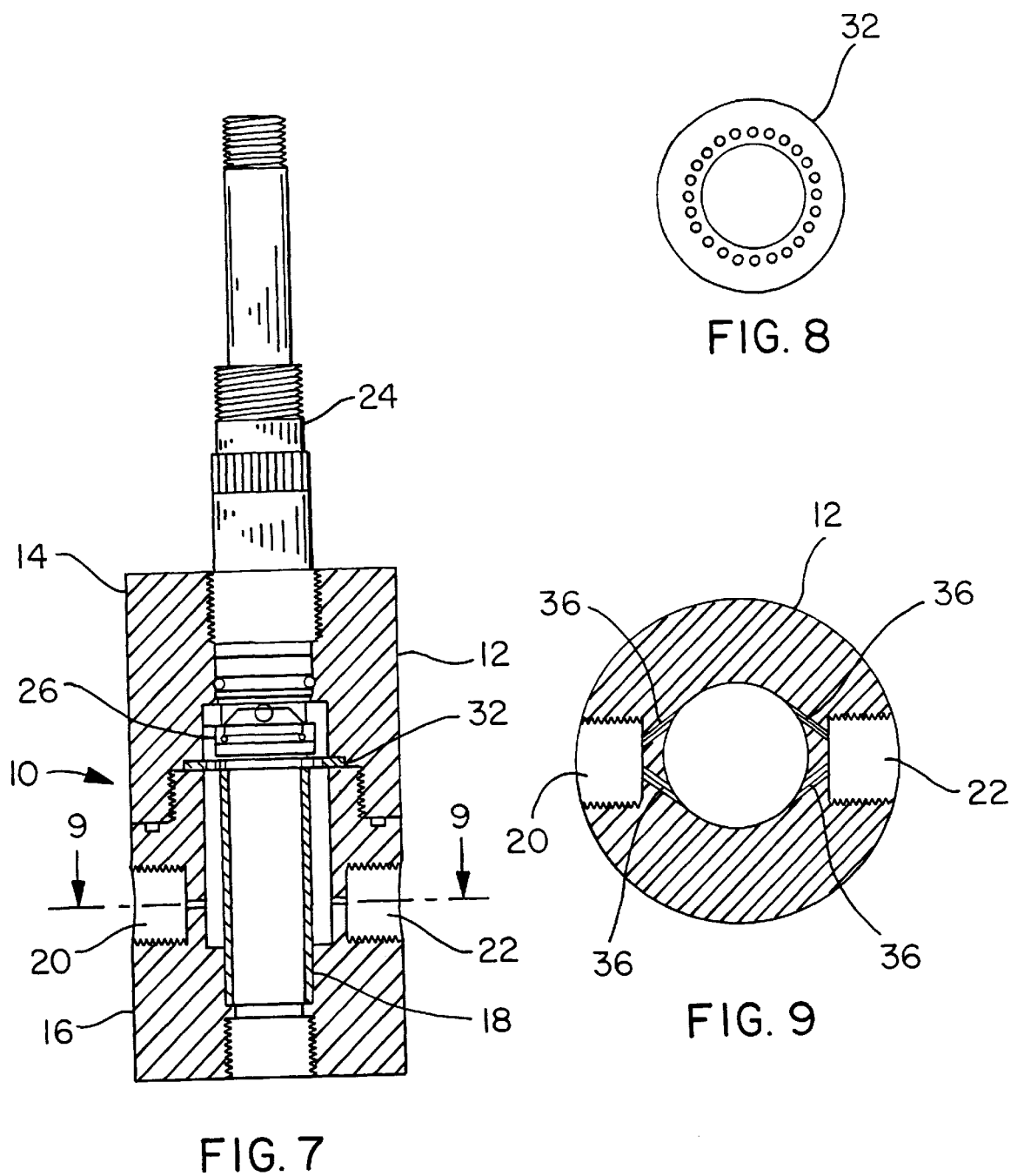

CHLORINE DIOXIDE GENERATOR

FIELD OF THE INVENTION

The present invention relates to an apparatus and a method for generating chlorine dioxide and, more particularly to a reaction column surrounding a center column having a motive fluid therein.

BACKGROUND OF THE INVENTION

Chlorine dioxide is a very valuable reagent, bleaching agent and disinfectant and is being used more widely. However, chlorine dioxide is unstable when compressed and cannot be transported easily. Thus, the material is usually generated at the site where it is to be used. Several commercial generators have been disclosed to produce chlorine dioxide. U.S. Pat. Nos. 4,247,531 and 4,590,057 to Hicks and U.S. Pat. No. 5,204,081 to Mason et al disclose apparatuses and methods which introduce reagents into a mix and dwell premix chamber, and are introduced transversely into a low pressure zone. That is, the vacuum which is formed in these generators pulls both the liquid phase and the gas phase into the side of the chamber in which the vacuum is formed. This causes fluctuations in the vacuum and inconsistencies in the operation of liquid control rotameters. The quantity of product is limited by the flow rate from the premix chamber. Santillie et al in U.S. Pat. Nos. 4,451,444 and 4,618,479 disclose a method and apparatus which introduces reagents at the bottom of a column which is cooled by a surrounding jacket. Water flowing in the cooling jacket is used in conjunction with a pump to produce a vacuum for the system.

The efficiencies of existing generators require improvement. Also, in order to change the production rate/unit time, the size of the reaction column and the fittings must be changed because a single size unit of existing generators has limited capacity.

BRIEF SUMMARY OF THE INVENTION

It is an object of the present invention to provide an improved generator for chlorine dioxide which produces the product over a large surface area without the choking effect of existing side inlets and is operative over a wide range of feed rates.

It is a further object to provide a single reaction column which produces chlorine dioxide over a wide range of output without requiring a change in reaction column size and without changing fittings.

It is still another object to provide a chlorine dioxide generator with high efficiency which is quiet in operation.

In accordance with the teachings of the present invention, there is disclosed an apparatus for the generation of chlorine dioxide having a reaction column having an upper end and an opposite lower end. Two spaced-apart inlets are formed on the lower end of the reaction column. A center column is disposed within, and surrounded by, the reaction column. A venturi throat is disposed above the center column. A stream of fluid is directed upwardly through the center column and through the venturi throat creating a reduced pressure zone at the upper end of the reaction column. A first reagent is introduced into one of the inlets and a second reagent is introduced into the second of the inlets. The first reagent and the second reagent are drawn upwardly through the reaction column by the reduced pressure at the upper end of the reaction column. The first reagent and the second reagent interact in the reaction columns and produce high yield of a reaction product. The reaction product passes through the diffuser, out of the venturi throat and out of the apparatus.

In another aspect, there is disclosed a method of generating chlorine dioxide having the steps of providing a reaction column having a first end and an opposite second end. Two spaced-apart inlets are formed on the lower end of the reaction column. A center column is disposed within and surrounded by the reaction column. A venturi throat is disposed above the center column. A stream of fluid is directed upwardly through the center column and through the venturi throat wherein a reduced pressure zone is created at the upper end of the reaction column. A first reagent is introduced into one of the inlets and a second reagent is introduced into the other of the inlets. The first reagent and the second reagent are drawn upwardly through the reaction column by the reduced pressure. The first and second reagents are distributed throughout the reaction column and interact within the reaction column to produce a high yield of chlorine dioxide. The chlorine dioxide passes out of the reaction column, through the venturi throat and out of the apparatus.

These and other objects of the present invention will become apparent from a reading of the following specification taken in conjunction with the enclosed drawings.

BRIEF DESCRIPTION OF THE DRAWINGS

FIG. 7 is a partial cross-sectional view of the generator with the center column, diffuser, nozzle and venturi throat.

FIG. 8 is a top plan view of the diffuser.

FIG. 9 is a cross-sectional view taken across the lines 9—9 of FIG. 7.

DESCRIPTION

Figure 1:
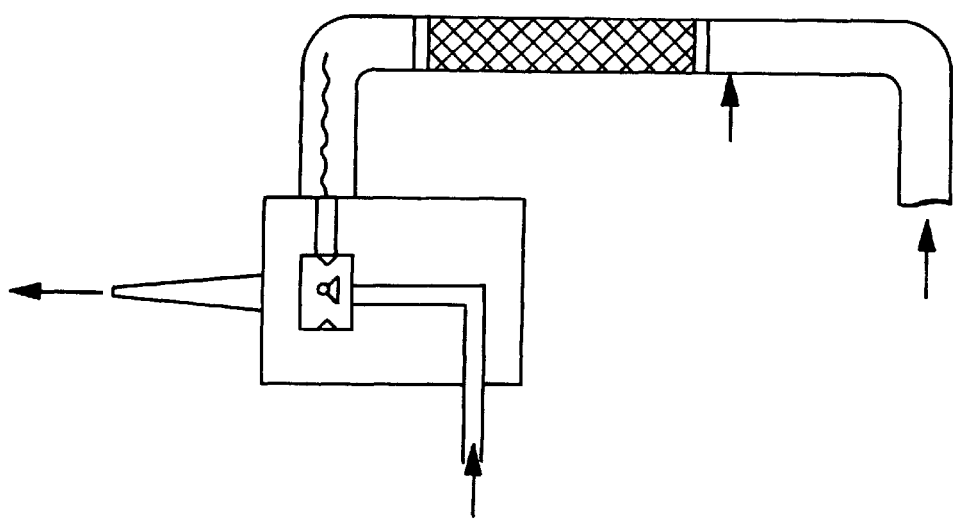
FIG. 1 is a schematic view of the prior art.
Figure 10:
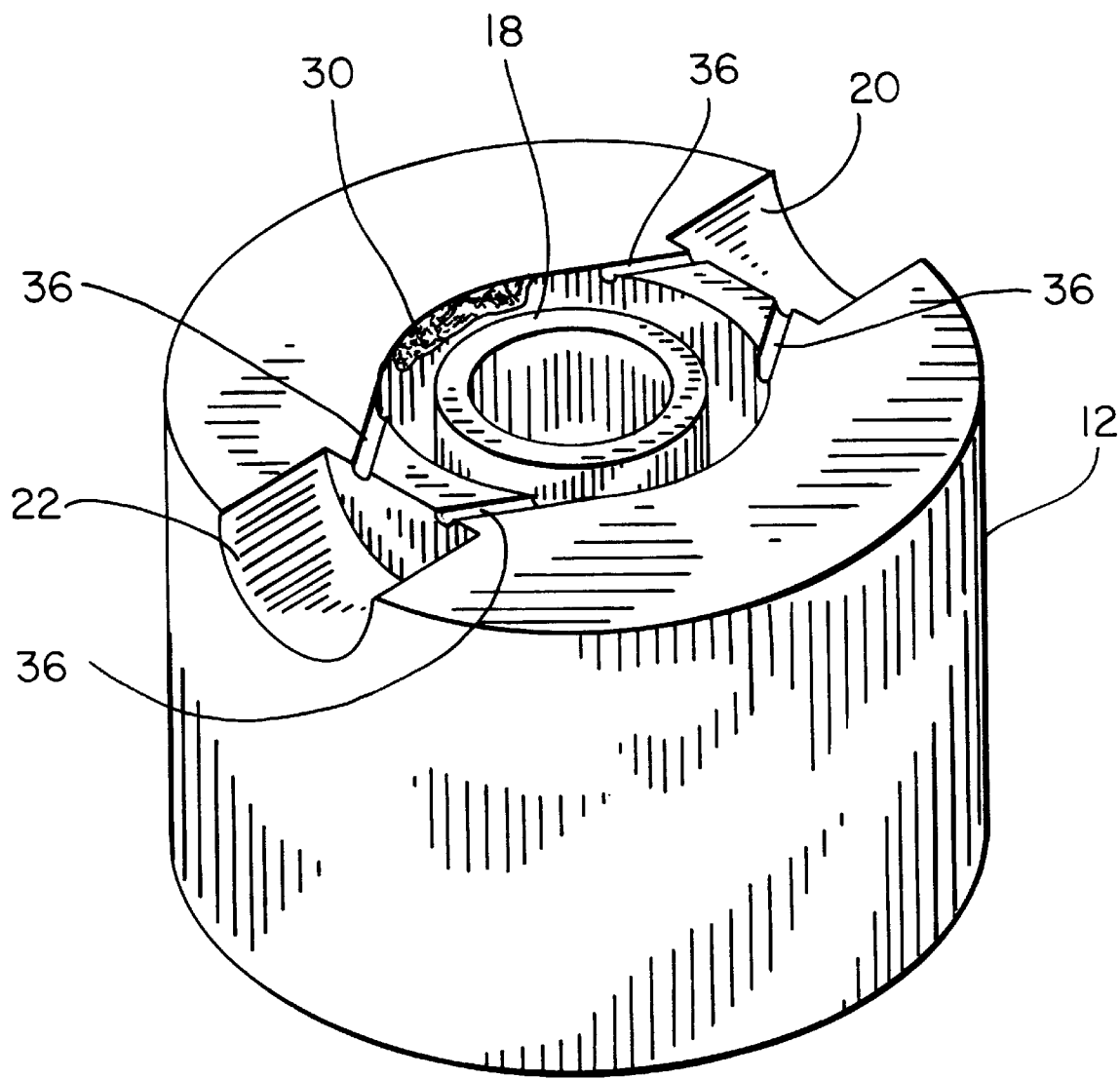
FIG. 10 is an enlarged perspective view of the inlet ports of the generator showing the "V" ports, the center column, packing and the reaction column.

The prior art, as shown in FIG. 1, introduces the reagents into a reaction column where mixing and interaction between the reagents is difficult to control. A reduced pressure zone is formed at the top of the reaction column to pull the reagents upwardly through the reaction column. However, there are frequently fluctuations in the reduced pressure which result in inconsistencies in the operation of liquid control rotameters which, in turn, affect the flow rate of the reagents. The production of the reduced pressure is by the flow of water through a venturi in a chamber. The top of the reaction column is connected at right angles to the reduced pressure chamber as in an "L" shape piping arrangement. The flow of reaction product and unused reactants is restricted and chokes because of the configuration and there is a meaningful change in the vacuum between the top and bottom of the reaction column. At times, the liquid reagent blocks, or partially blocks the connection between the top of the reaction column and the inlet to the vacuum chamber to shut down the generator. The configuration of the existing generator is such that the capacity of the generator, within a limited range, is a function of the dimensions of the reaction column and the quantities of reactants which can be introduced.

As shown in FIGS. 2–11, the generator 10 of the present invention overcomes the problems of the prior art by providing a reaction column 12 having an upper end 14 and a lower end 16. The reaction column 12 completely surrounds a center column 18. A stream of motive fluid, such as water, is passed upwardly through the center column 18 and into a nozzle 26 which is connected to a venturi throat 24. The flow of fluid produces a reduced pressure (vacuum) zone at the upper end 14 of the reaction column 12. The reduced pressure is also produced at the lower end 16 of the reaction column 12 with minimum difference between the vacuum at the upper end 14 as compared to the lower end 16.

Figure 2:
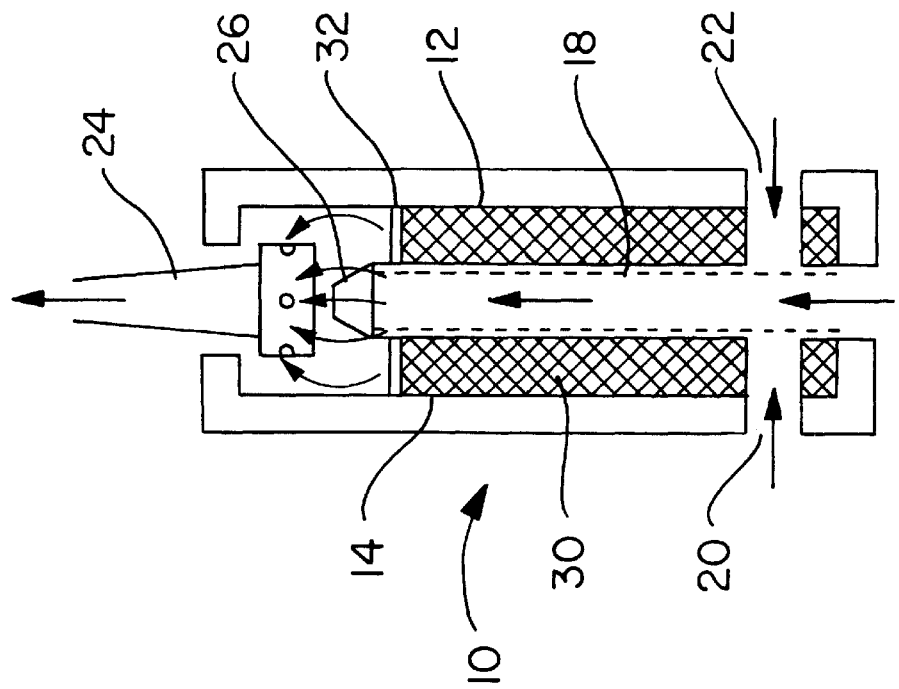
FIG. 2 is a schematic view of the present invention.

The reaction column 12 preferably is packed with Teflon chips, ceramic saddles or similar material. Preferably, a diffusor 32 is disposed at the top of the packing 30 at the upper end 14 of the reaction column 12 (FIGS. 2, 7, 8). The diffusor 32 preferably has a plurality of openings formed annularly around the diffusor 32 through which the reaction products exit the top of the packing 30 in the reaction column 12. Alternately, the diffusor 32 may be formed of a sintered material through which gas and liquid may pass. In addition to retaining packing within the reaction column, the diffusor 32 maintains a more even flow of gaseous product from the upper end 14 of the reaction column 12.

A first inlet 20 and a second inlet 22 are formed at the lower end 16 of the reaction column. Preferably, the inlets 20, 22 are approximately 180° apart. A first reagent such as an aqueous solution of chlorite is introduced into the first inlet 20. The first reagent may be sodium chlorite ranging in concentration up to 37% by weight. Other materials may be used including, but not limited to, other chlorites or other reagent systems conventionally used to prepare chlorine dioxide. The second reagent such as gaseous chlorine is introduced into the second inlet 16. The second reagent is not limited to gaseous chlorine and may include, but not be limited to, other reagent systems. The reagent system may be chlorites with acid, etc. The rate of flow of the respective reagents is monitored by flow meters or rotameters 34 to assure reproducible results in the generator. Valves (not shown) are set in the reagent feed lines in series with the rotameters 34 to provide an adjustment control for the flow rate of the respective reagents.

The first inlet 20 and the second inlet 22 are formed as "V" ports (FIGS. 9 and 10) in order to more effectively introduce the reagents to obtain improved interaction. Each "V" port is formed with two divergent arms 36 leading from the respective inlet 20, 22 into the lower end 16 of the reaction column 12. In this manner, the arms 36 from opposing inlets 20, 22 direct the reagents into more immediate contact to create an annular reaction zone within the reaction column 12. The reagents further interact as the reagents, and the product formed, travel upwardly through the reaction column 12. The reaction continues around the entire 360° of the reaction column providing an increased surface area in which the reaction may be completed. The reaction is completed with high yield when the travel to the upper end 14 of the column 12 is finished. This structure enables the present invention to be used over a comparatively broad range of capacity without requiring any change of size of the reaction column or of change in the size of the inlet ports. Prior technology required different reaction column volumes for different capacities of product.

Since the reaction column 12 provides for production of product for 360° around the motive fluid in the center column 18 and the gaseous product, with any unreacted liquid reagent, enters the venturi throat 24 through vents 46 over a wide surface, the problem of blockage, or flooding, encountered in the prior art, is avoided in the present invention. There is no possibility for the liquid reagents to flood the outlet because the outlet from the reaction column is not introduced into a narrow outlet as in the prior art. The liquid is drawn from a large surface at the upper end of the reaction column into the motive fluid.

Figure 6:
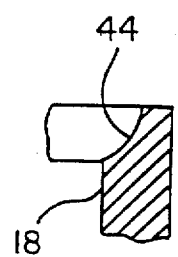
FIG. 6 is an enlarged partial view of the corner of the center column of FIG. 4.
Figure 5:
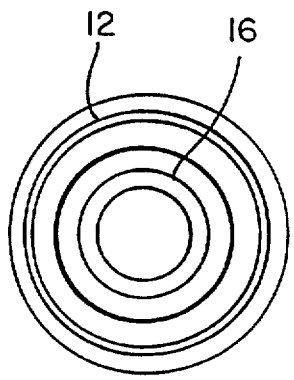
FIG. 5 is a cross-sectional view across the lines 5—5 of FIG. 4.

A sealant, such as O ring 28, is mounted on the nozzle 26 where the nozzle 26 abuts the upper end of the center column 18. As shown in FIG. 6, a concave portion 44 is formed on the inner wall of the center column 18 to cooperate with the sealant to prevent the motive fluid (water) from leaking into the reaction column 12 and to assure that the reagents and reaction product are directed above the nozzle 26 into the throat 24. This structure further prevents the flooding which is experienced with prior art devices. The gaseous product (chlorine dioxide) which exits the upper end 14 of the reaction column 12, enters the venturi throat 24 through a plurality of vents 46 formed in the venturi throat 24 adjacent to the nozzle 26. Preferably, there are four vents 46 formed in the venturi throat 24, the vents 46 being approximately 90° apart. Thus, the reaction products are carried out of the apparatus by the motive fluid passing from the center column 18, through the nozzle 26 and through the venturi throat 24.

Figure 11:
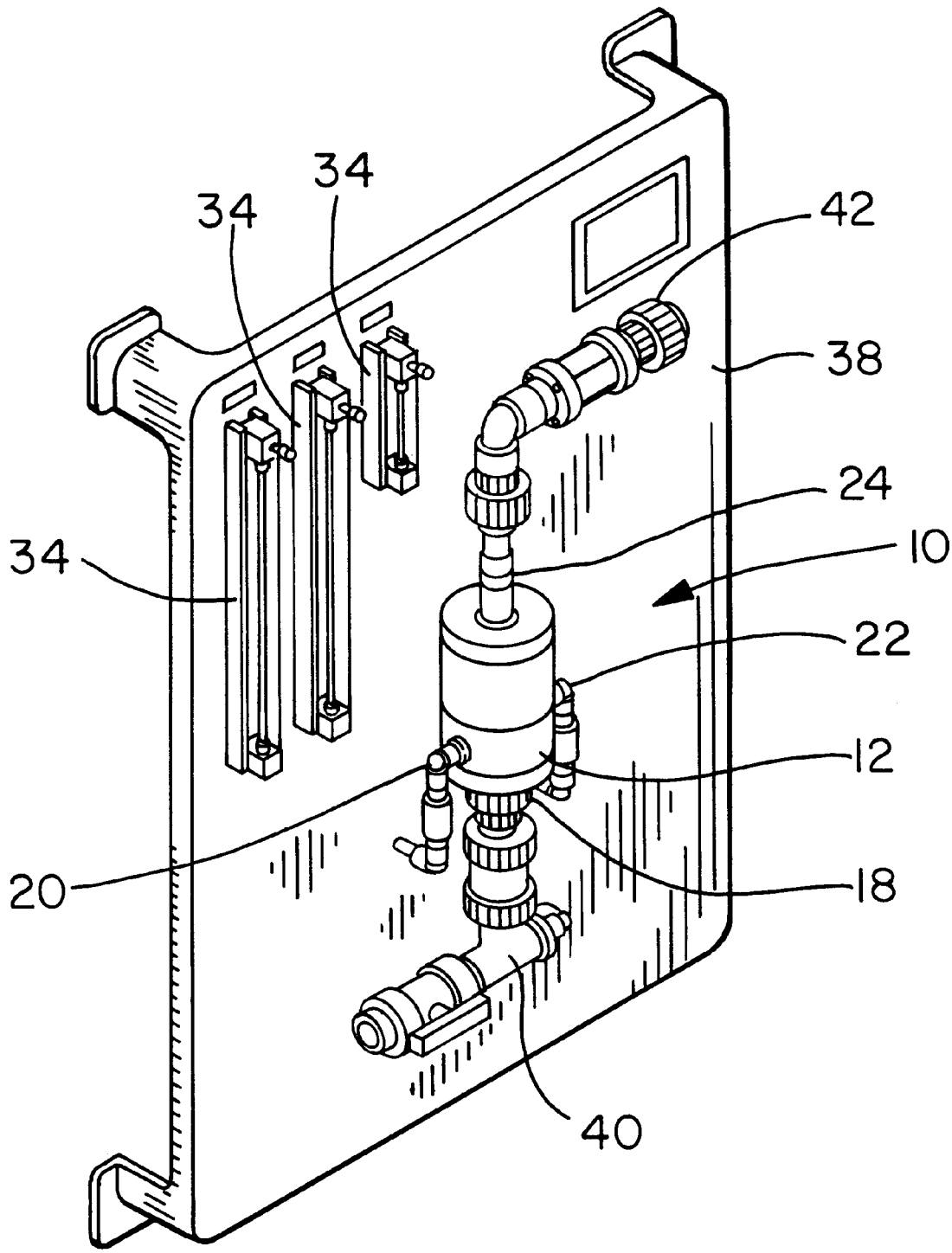
FIG. 11 is a perspective view showing the generator of the present invention mounted on backboard support.
Figure 2:
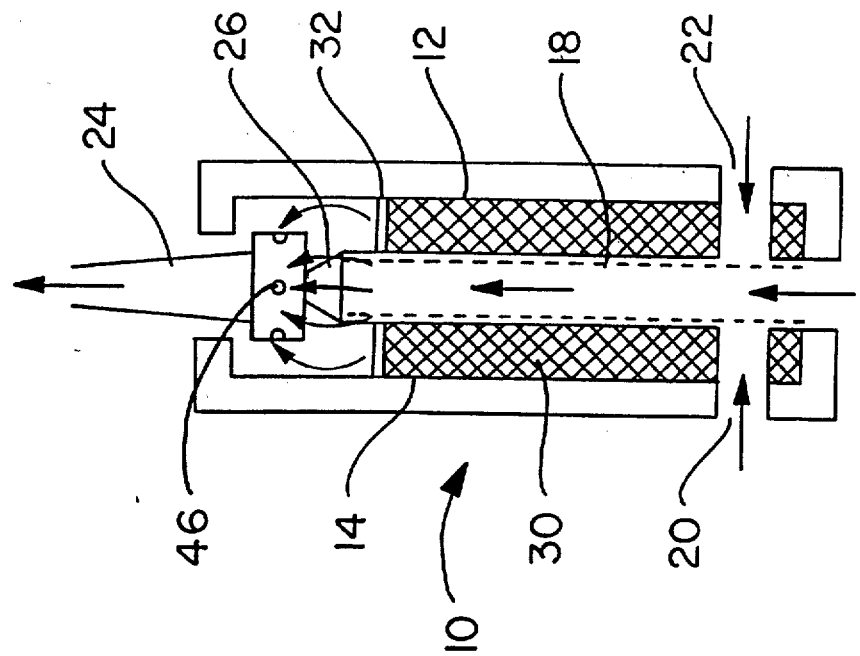
Figure 1:
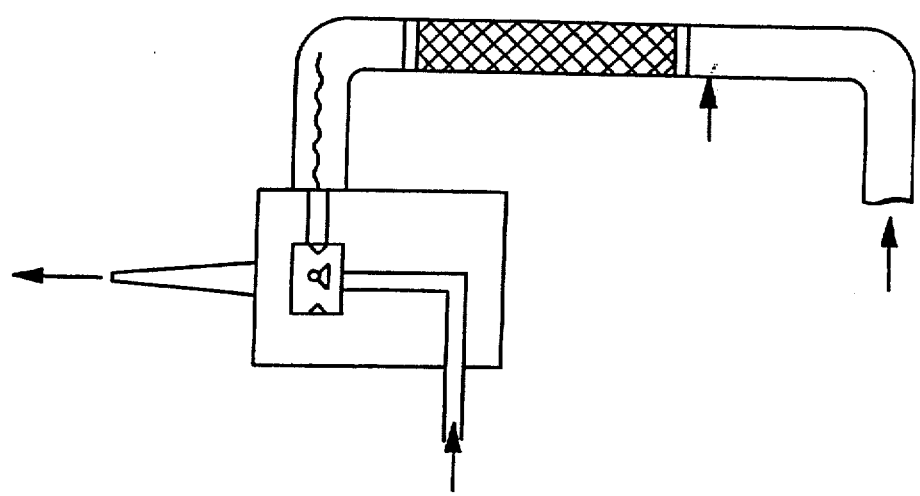
Figure 3:
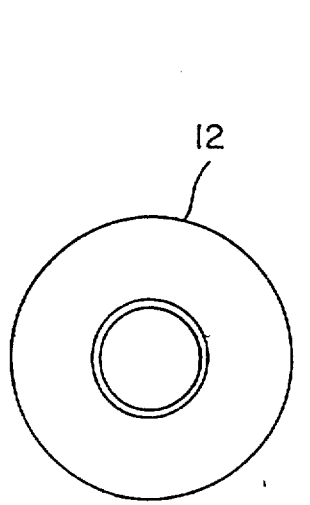
FIG. 3 is a top plan view of the generator.
Figure 4:
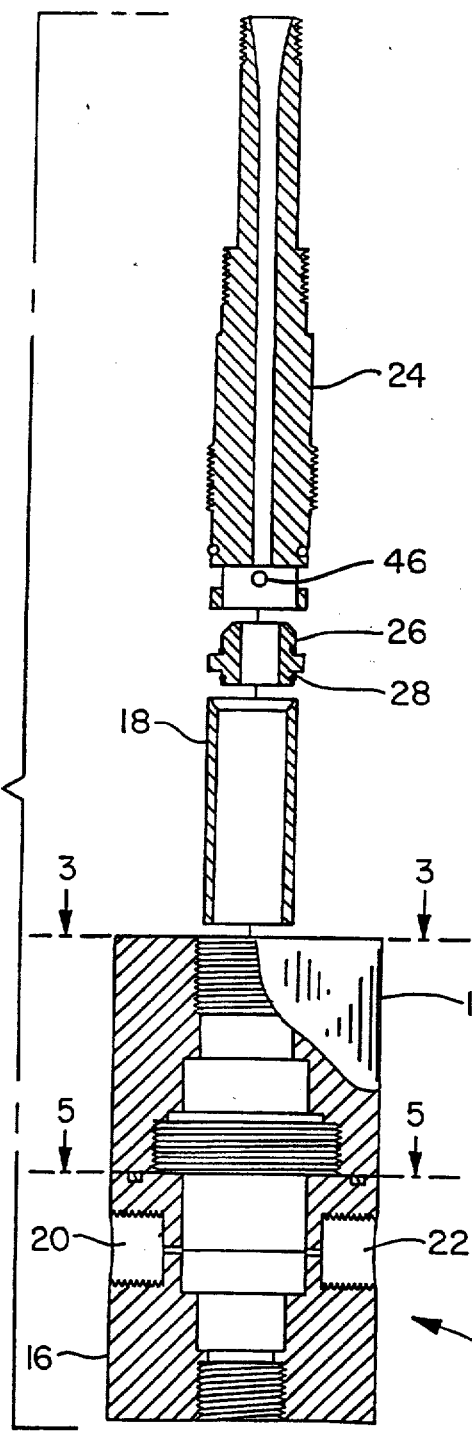
FIG. 4 is an exploded cross-sectional view across the lines 4—4 of FIG. 3 further showing the center column, nozzle and venturi throat removed from the generator.

A typical generator 10 of the present invention is shown in FIG. 11 mounted on a backboard support 38. The water supply line 40 introduces motive water into the center column which is surrounded by the reaction column 12. The reagents are introduced through the inlets 20, 22. The flow rates of the reagents are monitored by rotameters 34. Reaction product exits via the outlet 42. It is possible to provide a generator having a height of less than ten (10) inches and a diameter of approximately three (3) inches which can produce up to 500 lbs. of chlorine dioxide per day. The output may be varied to any desired amount within the limit by varying the concentration and/or rate of input of the reagents without any changes being made to the generator's size or fittings. This output capacity is very high considering the very small size of the apparatus.

The generator of the present invention operates quietly and efficiently. It can be operated continuously over a 24 hour period.

The generator may be used for the production of products other than chlorine dioxide by selection of the appropriate reagents.

Obviously, many modifications may be made without departing from the basic spirit of the present invention. Accordingly, it will be appreciated by those skilled in the art that within the scope of the appended claims, the invention may be practiced other than has been specifically described herein.

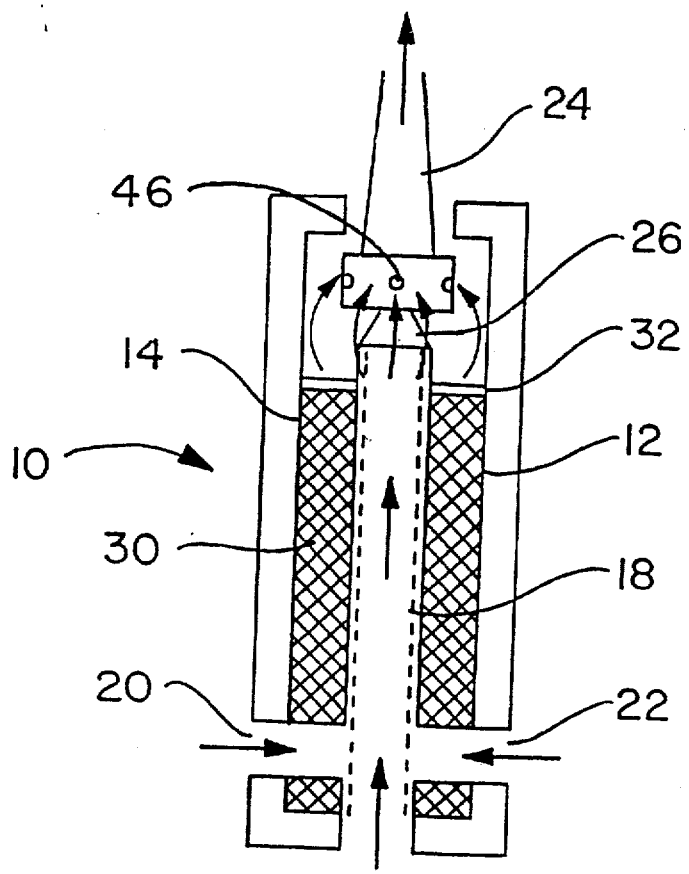

We claim:

1. An apparatus for the generation of chlorine dioxide comprising;

a reaction column having an upper end and an opposite lower end, two spaced-apart inlets formed on the lower end of the reaction column, a center column disposed within, and surrounded by, the reaction column, a venturi throat being connected to and disposed above the center column, a fluid supply line connected to the center column to upwardly direct a stream of fluid through the center column and through the venturi throat creating a reduced pressure zone at the upper end of the reaction column, a first source of a first reagent connected to one of the inlets and a second source of a second reagent connected to the second of the inlets, the first reagent and the second reagent being drawn upwardly through the reaction column by the reduced pressure at the upper end of the reaction column, the first reagent and the second reagent interacting in the reaction column and producing chlorine dioxide the chlorine dioxide passing out of the reaction column into the venturi throat and out of the apparatus.

2. The apparatus of claim 1, wherein the inlets are spaced apart by approximately 180°.

3. The apparatus of claim 1, wherein the inlets have a "V" port configuration.

4. The apparatus of claim 1, wherein the reaction column is packed.

5. The apparatus of claim 4, wherein the packing is Teflon chips.

6. The apparatus of claim 1, wherein a diffusor is connected to the upper end of the reaction column.

7. The apparatus of claim 6, wherein the diffusor is a plate having a plurality of spaced-apart openings formed therein.

8. The apparatus of claim 1, wherein the fluid supply line is connected to a source of water to introduce the water through the center column.

9. The apparatus of claim 1, wherein the first reagent is an aqueous chlorite solution and the second reagent is chlorine gas which react to for chlorine dioxide.

* * * * *

UNITED STATES PATENT AND TRADEMARK OFFICE
CERTIFICATE OF CORRECTION

PATENT NO. : 5,968,454
DATED : October 19, 1999
INVENTOR(S) : Deacon et al

Page 1 of 4

It is certified that error appears in the above-identified patent and that said Letters Patent is hereby corrected as shown below:

The figure on the title page and Figures 2, 3, 4 and 5 should be replaced with the enclosed figures.

In column 6, line 17, "for" should read --form--.

Signed and Sealed this

Fifth Day of September, 2000

Attest:

Q. TODD DICKINSON

Attesting Officer

Director of Patents and Trademarks

United States Patent [19]

Deacon et al.

[11] Patent Number: 5,968,454
[45] Date of Patent: Oct. 19, 1999

[54] CHLORINE DIOXIDE GENERATOR

[75] Inventors: Peter W. Deacon, Fair Oaks; Jess McLaughlin, Rio Linda, both of Calif.

[73] Assignee: Vulcan Chemical Technologies, Inc., West Sacramento, Calif.

[21] Appl. No.: 09/053,815

[22] Filed: Apr. 2, 1998

[51] Int. Cl.$^6$ .................... C01B 11/02; B01J 8/02
[52] U.S. Cl. .................... 422/120; 422/122; 422/211; 422/218; 422/305; 423/477
[58] Field of Search .................... 423/477–480; 422/120, 122, 305, 37, 181, 218, 211

[56] References Cited

U.S. PATENT DOCUMENTS

| | | | |
|---|---|---|---|
| 4,247,531 | 1/1981 | Hicks | 423/477 |
| 4,451,444 | 5/1984 | Santillie et al. | 423/480 |
| 4,590,057 | 5/1986 | Hicks | 423/477 |
| 4,618,479 | 10/1986 | Santillie et al. | 422/202 |
| 5,204,081 | 4/1993 | Mason et al. | 423/478 |

*Primary Examiner*—Hien Tran
*Attorney, Agent, or Firm*—Leonard Bloom

[57] ABSTRACT

An apparatus and method for generating chlorine dioxide. Reagents are introduced into the lower end of a reaction column through "V" inlets. The reagent column surrounds a center column through which motive fluid moves upwardly into a nozzle and venturi throat to produce a zone of reduced pressure at the upper end of the reaction column. The reagents move upwardly through the column interacting throughout 360°. Reaction product exits the generator through the venturi throat.

9 Claims, 5 Drawing Sheets